3,682,662
PROCESS FOR CANNING FRUITS
Jean Blezat, 117 Rue Sully 69, Lyon 6e, France, and Daniel Dumont, 106 Avenue de Versailles 75, Paris 16e, France
Filed Dec. 29, 1969, Ser. No. 888,737
Int. Cl. A23b 7/00
U.S. Cl. 99—186        3 Claims

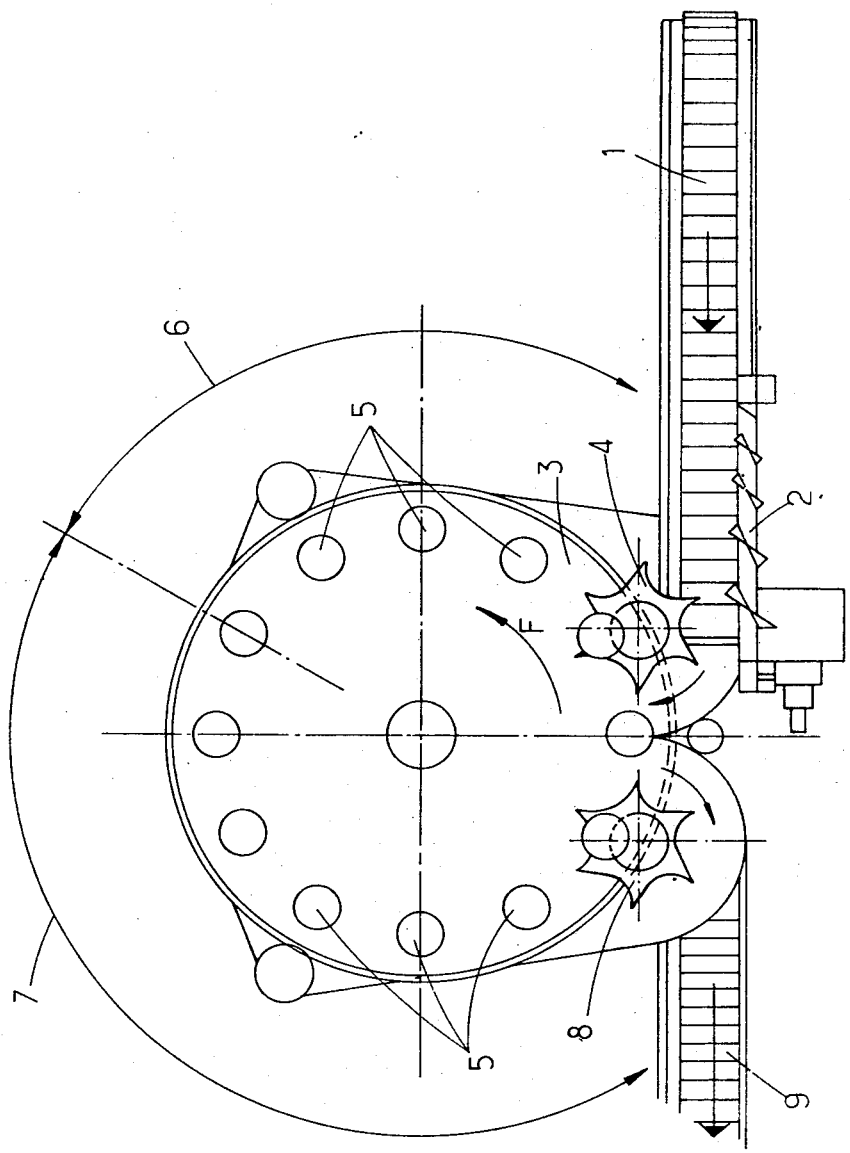

ABSTRACT OF THE DISCLOSURE

The invention relates to a process and an installation for the canning of foodstuffs consisting of admitting into a container the product to be canned and a certain amount of a complementary product having the same degree of quality as that present in the product to be canned, this admission being effected in such a way that the amount of the product to be canned and of the complementary product is constant; the invention also consists of admitting into the container a constant amount of a compensatory product whose quality is of a degree such that it produces the required degree of quality in the goods canned.

---

At the present time, when certain footstuffs are canned, it can be seen that there is a difference in quality between the different cans treated.

Thus, for example, when size 1/1 cans (synonym 4/4) of peaches in syrup (or other large fruits) are filled, the weight of fruit varies widely from one can to another. This results from the fact that each half fruit weighs on average more than 10 percent of the solid contents of the can. Thus, if one has fruit-halves weighing 40 to 80 grams and desires to have a minimum of 500 grams per tin, the weights will range from 500 to 580 grams.

Nowadays the sweetening operation, which consists of topping up the can with syrup, is carried out by means of a juicer with valves using syrup of 30 to 45 Brix in the majority of cases, which means that the cans with not much fruit are heavily sweetened and those with a lot of fruit are sweetened less.

Consequently there is a difference in quality of the products treated, and also an increase in the cost price.

Thus in the case of canning peaches in syrup, lets us suppose that the standard weight to be observed is a minimum of 500 grams of fruit, that the fruit remain whole during the sterilization process (net weight when canned= net weight when drained), that the final Brix index of the can after osmosis should be a minimum of 20, and that the individual weight of the peach halves canned varies between 40 and 80 grams. Let us suppose, in addition, that the standard total weight to be observed (fruit+ syrup) is a minimum of 850 grams, and that the Brix index of the fruit when canned (i.e. their natural sugar content) is 10 Brix.

The syrup to be added will be determined in such a way that the can containing the most fruit and therefore the least syrup has an index of 20 Brix. Thus for the fullest can, containing 580 grams of friut at 10 Brix, the natural sugar content of these fruit is 58 grams.

In consequence, the amount of syrup 850 grams—580 grams=270 grams will have to contain 170 grams—58 grams=112 grams of natural sugars. These 270 grams of syrup will therefore have to have a Brix index of 41.5 in order to obtain a size 1/1 can with a final Brix index of 20.

However, in the case of the can containing the least amount of fruit and therefore the most syrup, it will contain (supposing as a first approximation that the densities of both fruit and syrup are equal to 1):

Fruit 500 grams at 10 B, i.e. 50 grams of sugar
Syrup 350 grams at 41.5 B, i.e. 145.25 grams of sugar Total 850 grams containing 195.25 grams of sugar so that this can has a Brix index of 23.

Thus, excluding errors in measuring weight or volume, the different cans will have a difference in the Brix index of 3. It will be noticed that in fact the juicer with valves produces a constant total volume and not a constant weight, and that at normal canning temperatures the fruits have a density of less than 1 and the syrup a density of more than 1. Consequently the different cans will have a difference in the Brix index of more than 3 and a diifference in total weight of more than 10 grams.

The invention aims particularly at remedying these drawbacks, and to this end it concerns a process particularly for the canning of foodstuffs, characterized by the fact that the product to be canned is admitted into the container with a certain amount of an additional product having the same degree of quality as the product to be canned, this admission being effected in such a way that the amount of the product to be canned and of the additional product is constant. A constant amount of a compensatory product is also admitted into the container; the quality of this compensatory product is of a degree such that it produces the required degree of quality in the products canned, thus enabling a uniform quality of the contents of the different containers to be obtained, as well as a reduction in the cost price of these contents.

The invention also concerns the installation for the implementation of this or a similar process.

The invention also concerns the canned products obtained by the application of the process in accordance with the invention, or a similar process.

The invention also concerns the characteristics listed below, and their different possible combinations.

One process in accordance with the invention is illustrated as a non-limiting example in the attached drawing which is a schematic view from above of a juicer with valves for compensated sweetening.

The process in accordance with the invention could be applied to the canning of very diverse products, and particularly to the canning of foodstuffs in solid pieces, such as fruit, vegetables, fish, meats, which are canned with a syrup, juice, or sauce of any kind, the aim of the invention being to obtain a constant quality for a sum of different products canned together, these products being of a constant total amount (weight or volume).

The process is applicable when the products to be canned together can be divided into three groups.

The first group is made up of the product to be canned, that is to say, for example, fruits which vary in amount between two limits according to size, their quality, for example their degree of sweetness, being relatively constant.

The second group is made up of a so-called complementary product which is admitted in amounts varying in weight or volume, in such a way that the total amount of product to be canned and complementary product is constant in weight or in volume.

This complementary product has, in addition, a constant degree of quality equivalent to the degree of quality of the product to be canned. Thus, in the case of fruits in syrup, this complementary syrup will have a degree of sweetness, or Brix degree, equal to that of the fruits to be canned.

The third group is made up of a so-called compensatory product of which the weight or volume admitted is determined in such a way that the total amount of product to be canned, complementary product and compensatory product, attains a predetermined weight or volume.

In addition, the degree of quality of this compensatory product (for example the Brix degree in the case of sugar syrup) is determined in such a way that the final quality of the conditioned whole is situated at a determined degree. It should be understood, in addition, that the term "amount" can indicate weights or volumes.

The process in accordance with the invention will now be described as an example for canning peaches in syrup, that is to say that in this case the complementary product is a liquid, whilst the compensatory product may be either liquid or solid, the degree of quality to be kept constant for all the containers being the degree of sweetening, that is to say the Brix degree.

In this case, the peach halves whose individual weights vary, for example, from 40 to 80 grams, are separated into several sizes, so that only peach halves of approximately the same weight are included in the same container. These peach halves have a natural sugar content of, for example, 10 Brix.

The aim will be to obtain in each container, and for example in each can, a minimum total net weight of 850 grams, whose sweetness index after osmosis will be 20 Brix, and consisting of at least 500 grams of fruits. It is also supposed that the fruits remain whole during sterilization (net weight when canned=net weight when drained).

When canning, therefore, a certain weight of fruit is admitted which can vary between 500 and 580 grams per can.

Then, also supposing as a first approximation that the densities of the fruit and syrup are equal to 1, a syrup containing 10 Brix is admitted into this can, so that the total amount of fruit plus syrup attains a constant predetermined weight, for example 580 grams. Finally, 270 grams of concentrated syrup at 41.5 Brix is admitted to obtain canned products having the required degree of quality.

In effect:

Fruit to be canned 500 to 580 g. at 10 B, i.e. 50 to 58 g. of sugars
Complementary syrup 80 to 0 g. at 10 B, i.e. 8 to 0 g. of sugars
Compensatory syrup 270 g. at 41.5 B, i.e. 112 g. of sugars
Total 850 g. at 20 B, i.e. 170 g. of sugars.

In this process, it will thus be seen that whatever the exact weight of fruit admitted into the can, the weight of fruit + complementary syrup will always be 580 g. of which 58 g. of sugars.

Thus, supposing that the peaches admitted weigh exactly 500 g., in this case 80 g. of complementary syrup at 10 B is admitted, so as still to obtain a total weight of 850 g. at 20 percent Brix degree by the addition of 270 g. of compensatory syrup at 41.5 B.

It will be noted that in fact the juicer with valves produces a constant total volume and not a constant weight, and that at normal canning temperatures the fruits have a density of less than 1 and the syrups have densities of more than 1. Consequently the different cans will have a difference in the Brix index of about 0.5 and a difference in total weight of about 3 grams.

In this process, the admission of complementary syrup may or may not follow directly after the admission of the fruit, whilst the admission of compensatory syrup can be effected either before the admission of the fruit or after admission of the complementary syrup, or else between the two.

As a result, following the sweetening process in accordance with the invention, a reduction in the cost price is obtained, and a constant degree of quality of the different containers, excluding, of course, various errors in measuring weight or volume which could result from the measurement of the three constituents admitted into the container.

In the production example illustrated in the attached drawing, a compensated sweetening installation in accordance with the invention is shown, in which the complementary and compensatory products are liquids.

The containers used are fairly rigid and identical to the type used for canning foods. This installation comprises a juicer with valves into which the containers enter from a horizontal conveyor belt and are separated from each other by a horizontal device with a helicoidal screw 2 whose speed can be varied.

These containers are then admitted onto the turntable 3 by a star-shaped distributor 4. The turntable rotates in the direction of of the arrow F, and each of the containers is hermetically sealed by a valve 5 which descends vertically to cover it.

In an initial sector 6 of the rotation of the turntable, a constant volume of compensatory liquid is injected into each of the containers which already contain a certain amount of fruit situated between maximum and minimum limits.

In the second sector 7 of the rotation of the turntable, a variable amount of complementary liquid is admitted into the container in addition to the other products previously admitted, up to a pre-determined volume.

The containers are then removed from the turntable after the valves 5 have been raised vertically to liberate them. This removal is effected by means of a star-shaped distributor 8 which then lines them up on a horizontal evacuation conveyor belt 9.

A comparison of the following tables, the first of which concerns the compensated sweetening process and the second the traditional sweetening process, will show more clearly the characteristics and advantages of the process forming the object of the invention.

It will be noted that because of the differences in density the complementary syrup must be slightly richer in sugar than the fruit.

With the traditional process, total weights (fruit+syrup) varying from 850 to 865.2 grams (100 to 118) and Brix indices (after osmosis) varying from 20 to 23 (100 to 116.5) respectively, are obtained. The average amount of added sugar necessary is 136.8 grams per can.

With the compensated sweetening process, total weights (fruit+syrup) are obtained which vary only from 850 to 853.1 grams (100 to 100.4), and constant Brix indices (after osmosis) of 20. The average amount of added sugar necessary is 117.5 grams per can. The saving in sugar is therefore nearly 20 grams per can.

It will also be noted that the compensated sweetening process in accordance with the invention can be used to obtain a lower Brix index (after osmosis) than that of the fruit canned. The compensatory syrup should then be less rich than the fruit (it can even be replaced by water). This may be useful if it is desired to recondition fruit to a final index lower than that of the initial canning.

It should be understood that the invention is not limited to the production examples described and presented above, for which other methods and other forms of production can be foreseen which in no way exceed the compass of the invention.

DETAILS OF THE CONTENTS OF CANS FILLED ACCORDING TO THE COMPENSATED SWEETENING SYSTEM

| | Canned weights, g. | Sugar content, g. per 100 g. | Weight of sugars, g. | Densities | Volumes canned, cm.³ | Sugar content, g. per 100 cm.³ | Observations |
|---|---|---|---|---|---|---|---|
| A. Can containing greatest amount of fruit: | | | | | | | |
| Peaches | 580.0 | 10.0 | 58.0 | 0.970 | 597.9 | 9.7 | |
| Compensatory syrup | 270.0 | 41.5 | 112.1 | 1.155 | 233.8 | 47.9 | |
| Complementary syrup | 0 | 0 | 0 | 0 | 0 | 0 | |
| Totals | 850 | | 170.1 | | 831.7 | | |
| Averages | | 20.0 | | 1.022 | | 20.5 | |
| B. Can containing average amount of fruit: | | | | | | | |
| Peaches | 530.0 | 10.0 | 53.0 | 0.970 | 546.4 | 9.7 | In total 117.5 g. of sugar added, i.e. 19.3 g. less than with the traditional process. |
| Compensatory syrup | 270.0 | 41.5 | 112.1 | 1.155 | 233.8 | 47.9 | |
| Complementary syrup | 52.0 | 10.4 | 5.4 | 1.009 | 51.5 | 10.5 | |
| Totals | 852.0 | | 170.5 | | 831.7 | | |
| Averages | | 20.0 | | 1.024 | | 20.5 | |
| C. Can containing least amount of fruit: | | | | | | | |
| Peaches | 500.0 | 10.0 | 50.0 | 0.970 | 515.5 | 9.7 | In total 120.8 g. of sugar added, i.e. 30.8 g. less than with the traditional process. |
| Compensatory syrup | 270.0 | 41.5 | 112.1 | 1.115 | 233.8 | 47.9 | |
| Complementary syrup | 83.1 | 10.4 | 8.7 | 1.009 | 82.4 | 10.5 | |
| Totals | 853.1 | | 170.8 | | 831.7 | | |
| Averages | | 20.0 | | 1.026 | | 20.5 | |

DETAILS OF THE CONTENTS OF CANS FILLED ACCORDING TO THE TRADITIONAL PROCESS

| | Canned weights, g. | Sugar content, g. per 100 g. | Weight of sugars, g. | Densities | Volumes canned, cm.³ | Sugar content, g. per 100 cm.³ | Observations |
|---|---|---|---|---|---|---|---|
| A. Can containing greatest amount of fruit: | | | | | | | |
| Peaches | 580.0 | 10.0 | 58.0 | 0.970 | 597.9 | 9.7 | |
| Syrup | 270.0 | 41.5 | 112.1 | 1.115 | 233.8 | 47.9 | |
| Totals | 850.0 | | 170.1 | | 831.7 | | |
| Averages | | 20.0 | | 1.022 | | 20.5 | |
| B. Can containing average amount of fruit: | | | | | | | |
| Peaches | 530.0 | 10.0 | 53.0 | 0.970 | 546.4 | 9.7 | |
| Syrup | 329.5 | 41.5 | 136.8 | 1.155 | 285.3 | 47.9 | |
| Totals | 859.5 | | 189.8 | | 831.7 | | |
| Averages | | 22.1 | | 1.033 | | 22.8 | |
| C. Can containing least amount of fruit: | | | | | | | |
| Peaches | 500.0 | 10.0 | 50.0 | 0.970 | 515.5 | 9.7 | |
| Syrup | 365.2 | 41.5 | 151.6 | 1.155 | 316.2 | 47.9 | |
| Totals | 865.2 | | 201.6 | | 831.7 | | |
| Averages | | 23.3 | | 1.040 | | 24.2 | |

What is claimed is:

1. A process for canning foodstuffs which comprises:
   (a) placing into containers a food product to be canned, said food product containing natural sugars and being in solid pieces of different sizes;
   (b) placing into each of said containers a second product which has the same amount of sweetness as said food product, the amount of said second product placed into each container being such that the total amount of food product and second product in each container is a constant; and
   (c) placing into each of said containers a constant amount of a third product.

2. The process of claim 1 in which said third product is a syrup which is sweeter than said food product.

3. A process for canning foodstuffs which comprises:
   (a) placing into containers a food product to be canned, said food product being a fruit and having solid pieces of different sizes, thus preventing a constant amount of said food product from being placed in each container;
   (b) placing into each of said containers a second product which is a syrup which has the same degree of sweetness as said food product at essentially the same concentration as is contained in said food product, the amount of said second product placed into each container being such that the total amount of food product and second product in each container is a constant; and
   (c) placing into each of said containers a constant amount of a third product which is a syrup which is sweeter than said food product.

References Cited

UNITED STATES PATENTS

| | | | |
|---|---|---|---|
| 2,134,060 | 10/1938 | Schaefle | 99—104 |
| 2,426,076 | 8/1947 | Zenzes | 99—104 X |
| 2,502,196 | 3/1950 | Ball | 99—186 |
| 2,618,564 | 11/1952 | Mills, Jr., et al. | 99—193 |
| 2,874,059 | 2/1959 | Powers et al. | 99—186 |
| 3,117,877 | 1/1964 | Byer et al. | 99—192 |
| 3,169,874 | 2/1965 | Birchall | 99—182 |

FOREIGN PATENTS

| | | | |
|---|---|---|---|
| 498,319 | 12/1953 | Canada | 99—186 |

NORMAN YUDKOFF, Primary Examiner

H. H. BERNSTEIN, Assistant Examiner

U.S. Cl. X.R.

99—182, 190